United States Patent [19]

Balzano et al.

[11] 4,233,886

[45] Nov. 18, 1980

[54] SEALING DEVICE FOR HYDRAULIC PISTON MECHANISM

[75] Inventors: Lucien D. Balzano, Jouars Pounchar Vrain; Marc V. A. Lepretre, Bois-Colombes, both of France

[73] Assignee: Bertin & Cie, Plaisir, France

[21] Appl. No.: 930,042

[22] Filed: Aug. 1, 1978

[30] Foreign Application Priority Data

Aug. 1, 1977 [FR] France ................. 77 23610

[51] Int. Cl.³ ................. F01B 31/10; F16J 15/40
[52] U.S. Cl. ................. 92/86.5; 92/127; 92/168; 92/DIG. 2
[58] Field of Search ................. 92/DIG. 2, 86.5, 127; 417/437

[56] References Cited

U.S. PATENT DOCUMENTS

| | | | |
|---|---|---|---|
| 2,278,395 | 3/1942 | Lichte et al. | 92/86.5 |
| 2,612,116 | 9/1952 | Lowther, Sr. | 92/86.5 |
| 3,150,570 | 9/1964 | Johnson et al. | 92/DIG. 2 |
| 3,168,013 | 2/1965 | Williamson | 92/DIG. 2 |

FOREIGN PATENT DOCUMENTS

| | | | |
|---|---|---|---|
| 988366 | 5/1976 | Canada | 92/86.5 |
| 1528547 | 11/1969 | Fed. Rep. of Germany | 417/437 |

*Primary Examiner*—Paul E. Maslousky
*Attorney, Agent, or Firm*—Laurence R. Brown

[57] ABSTRACT

A sealing device for a high pressure hydraulic piston mechanism in which the gap between the cylinder in which the piston is slideable to pressurize delivery fluid therein is sealed by sealing fluid drawn from a separate supply to that of the delivery fluid, delivery means being associated with the sealing fluid supply and being operable in response to pressurization of the delivery fluid to deliver sealing fluid to said gap at a pressure sufficient to form a seal therein, the sealing fluid of said seal being in direct contact with the pressurized delivery fluid and the piston being movable in at least one hydrostatic bearing supplied with sealing fluid in parallel to the supply thereof to said gap between the piston and the cylinder.

9 Claims, 5 Drawing Figures

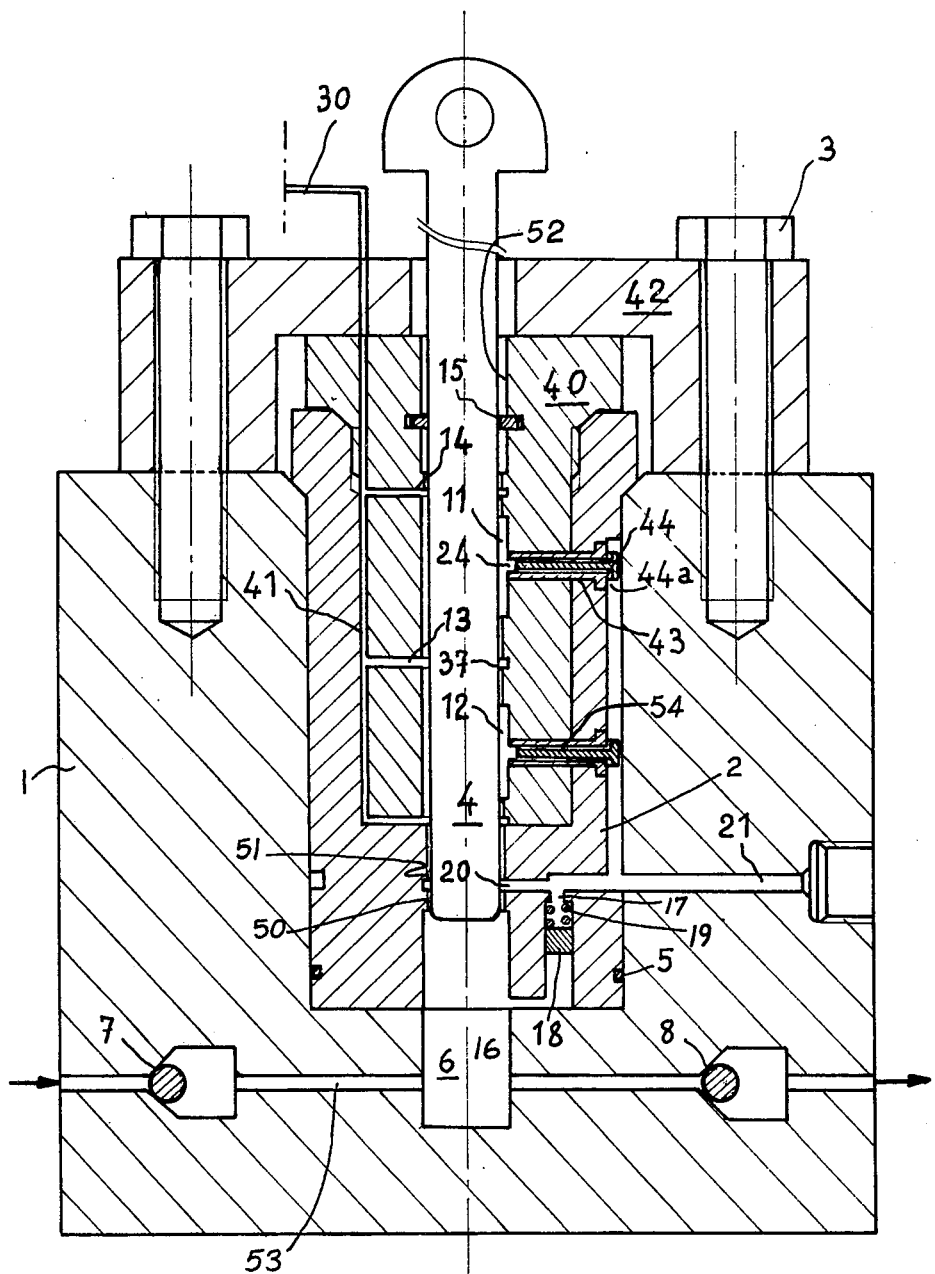
Fig._3

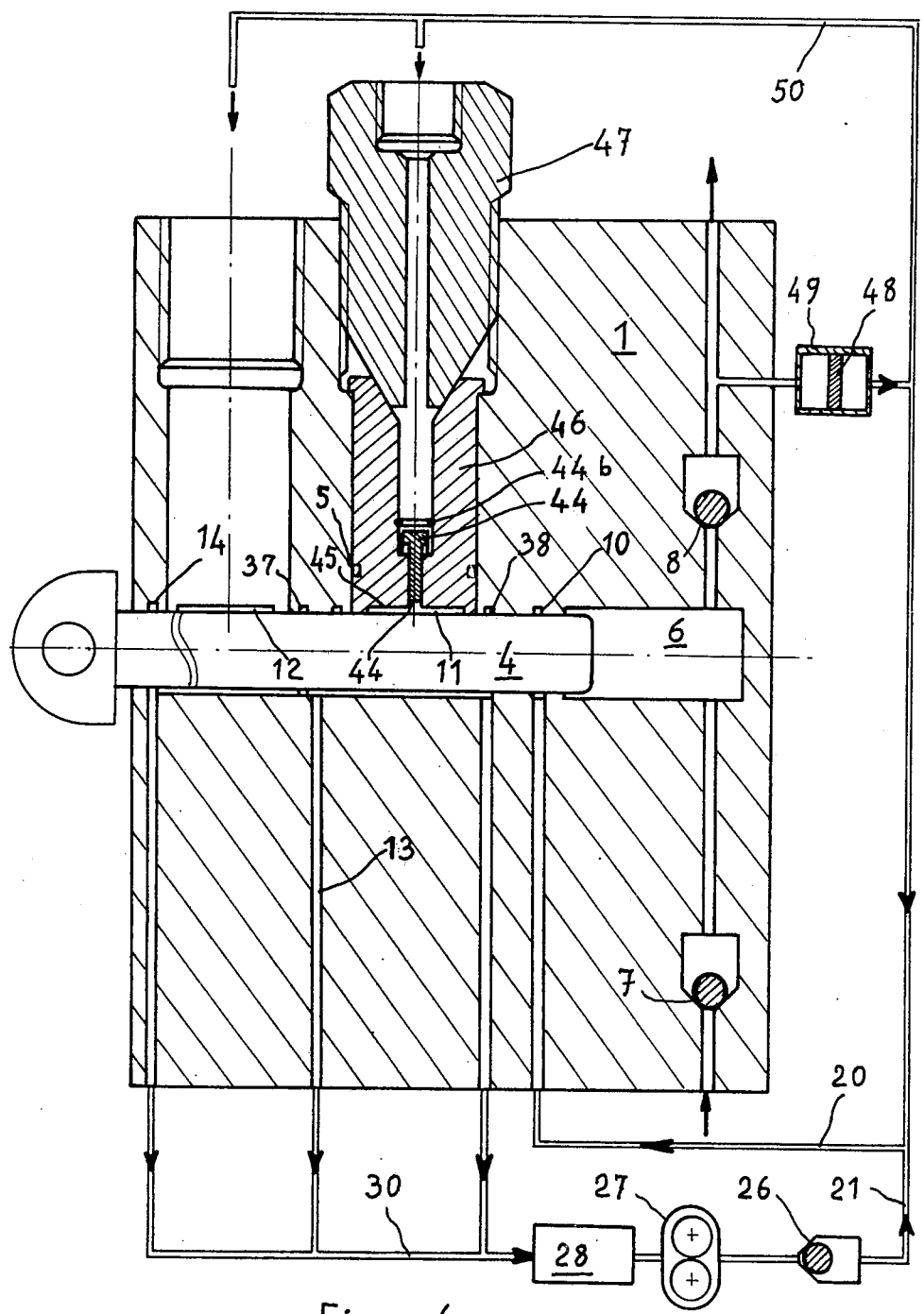
Fig. _4

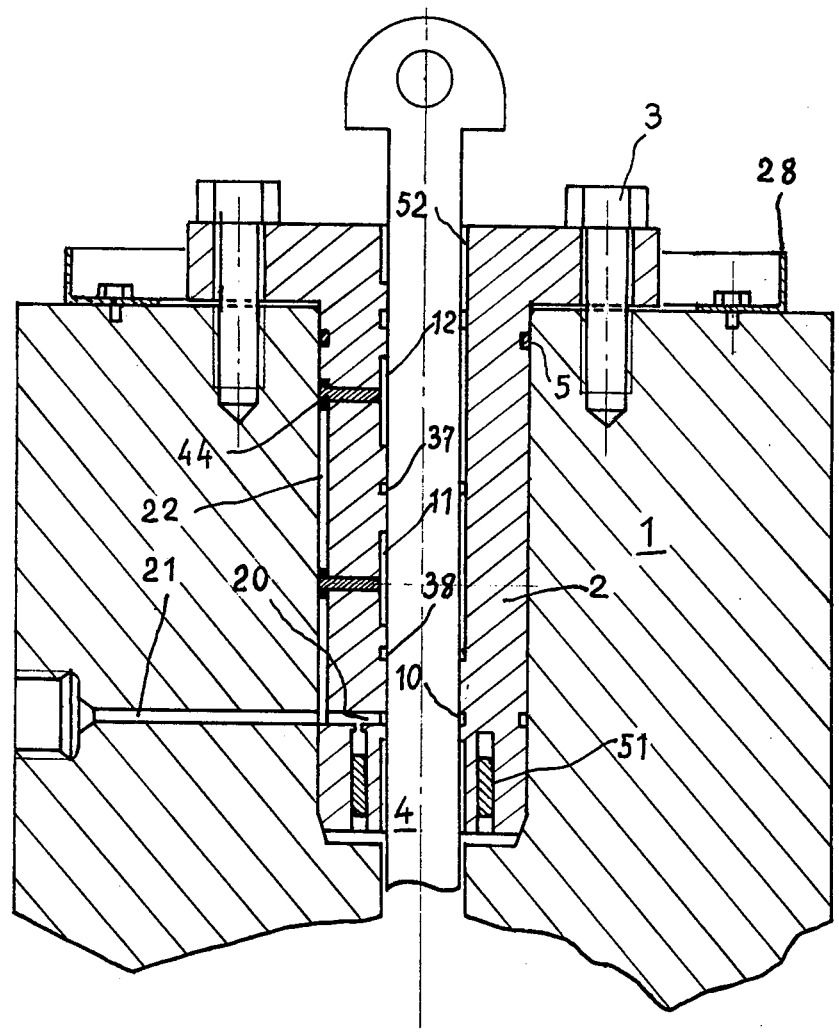
Fig. _ 5

SEALING DEVICE FOR HYDRAULIC PISTON MECHANISM

The present invention refers to a device for sealing between a fixed bore and a movable piston actuated by a relative motion to and fro. These parts may be employed in order to produce a very high pressure pumping unit, or else a hydraulic motor or a pressure transformer.

This device combines a known principle of a fluid seal disclosed for example, in the French Pat. No. 2 225 043 or Canadian Pat. No. 988366 by the Union Carbide Corporation, having at least one hydrostatic fluid bearing which guides the movable piston in its to and fro motion.

The said known principle of a fluid seal consists in injecting under pressure an auxiliary viscous lubricating fluid between the main fluid being pumped and the environment, with a scraper segment between the fluids which prevents the auxiliary viscous fluid from mixing with the main fluid being pumped. In accordance with the invention, on the contrary, the auxiliary viscous fluid is here in direct contact with the main fluid under pressure. It may be chosen, for example, for its miscibility with the latter, in particular if the main fluid being pumped is water. In fact it has been verified that solution of the auxiliary viscous fluid in a very small amount does not alter the properties of the main fluid being pumped.

One disadvantage of known pumps lies furthermore in the fact that upon an eccentricity of the piston there is a risk of breaking up of the film of viscous fluid downstream of the fluid seal, with a consequent risk of seizure of the piston.

The present invention corrects the above disadvantage and ensures great reliability with this type of pump whilst avoiding the use of costly materials such as tungsten carbide.

For this purpose, and in accordance with a second improvement, the sealing being ensured by a fluid seal having direct contact as already indicated, centreing of the movable equipment is in addition ensured by one or preferably two hydrostatic fluid guide bearings. Each of these consists in general of at least three plenums in the form of hydrostatic fluid films or cushions (hereinafter referred to as cushions) arranged uniformly round the piston in one and the same transverse plane. Such hydrostatic bearings are well known.

At least two circular grooves opening out to atmospheric pressure recover the leakages from these cushions and from the fluid seal.

The combination of the two fluid bearings arranged at a suitable distance enable the torque reaction which is possibly generated by the mechanical control at the end of the piston to be compensated.

Feeding of the bearings is effected in accordance with a load loss or pressure drop by prior throttling of the viscous fluid. The latter is put under pressure by means of a small auxiliary piston actuated by the fluid being pumped when it is at high pressure.

In parallel and in accordance with the invention this piston likewise feeds a circular groove located upstream of the bearings which ensures the sealing between the piston and the fixed bore by means of the fluid seal having direct fluid to fluid contact.

The advantage of the invention lies in the fact that the absence of mechanical contact between the piston and the pump body due to the fluid seal having direct fluid to fluid contact is kept without wear thanks to the fluid bearing system which ensures accurate guidance without frictional contact of the piston against the bore.

During the phase of suction of the fluid being pumped which is then at low pressure, a conventional circulating mechanism having valves ensures the renewal of the small portion of the viscous sealing fluid which left the device during the preceding cycle of operation, for the greater part by passing through the fluid bearing or bearings.

The present invention is intended, for example, for liquid cutting-jet plants employed in the cutting up of very diverse materials (leathers and plastics, stone, etc.) and for chemical plants which necessitate, for example, the putting into effect of processes of polymerisation and/or of catalysis at high pressure, for example, at 3000 bars.

The invention will be described in greater detail in relation to the attached drawings by way of example.

FIGS. 3, 4 and 5 are partial axial sections with flow diagrams for three other embodiments.

Figure 1:
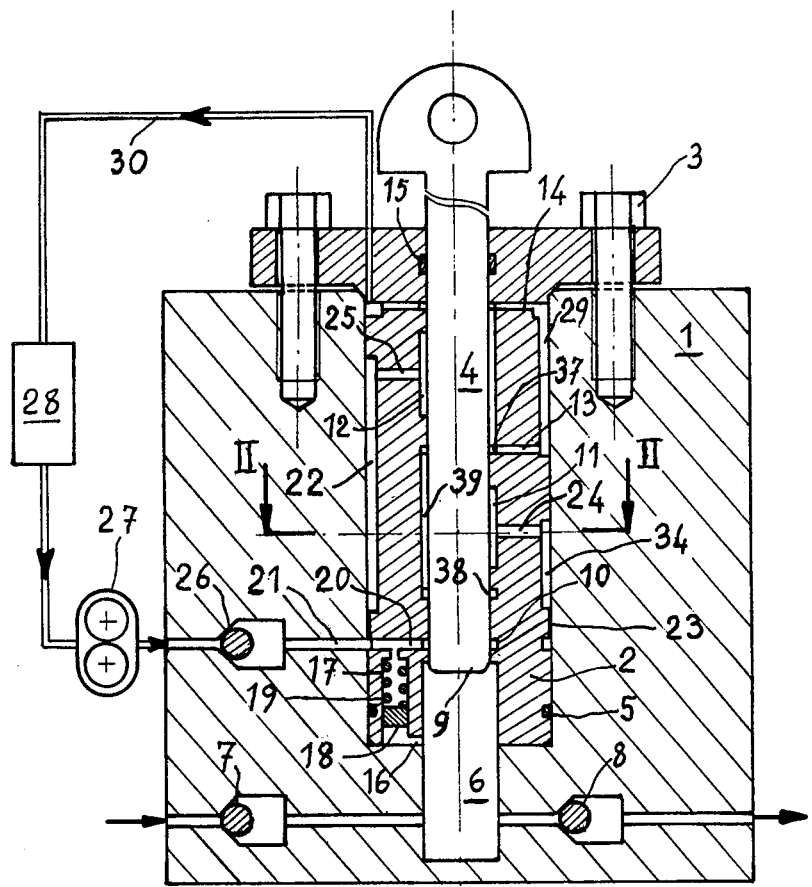
FIG. 1 represents in axial section a first embodiment with a diagram of the flow of the fluids.

In FIG. 1 a volumetric pump comprises a main body 1, a sleeve 2 which is made integral with the main body by bolts such as 3 and a seal 5.

The framing and housing of the pump have not been shown nor the connecting rod bearings and the motor controlling the piston 4 and the circuit of the fluid being pumped. The chamber intended for the fluid being pumped is represented at 6 with suction 7 and delivery 8 valves connected through hydraulic flow channels 53 (FIG. 3).

Starting from the head 9 of the piston 4 one finds in succession along the bore 52 (FIG. 3) forming the cylinder wall 51 (FIG. 3) in the sleeve 2:
  the fluid seal formed by a circular groove 10,
  two fluid bearings 11 and 12,
  channels 13 and 14 for recovery of leakages,
  a scraper seal 15 between the fluid bearing 12 and the environment.

Three pressure ducts distributed uniformly round the bore, one of which is represented at 16, each connect the chamber 6 to a cylindrical chamber such as 17, equipped with an auxiliary piston 18 biased with a spring 19 opposing the action of the main fluid being pumped.

Each of the three auxiliary pistons 18 divides its cylinder 17 into two portions. That portion which includes the spring 19 is connected:
  to the fluid seal 10 through the channel 20,
  to the general feed of viscous fluid through the channel 21,
  to the general feed 22 to the bearings 11 and 12 through a circular close clearance passageway hereinafter termed throttle 23.

The fluid bearings 11 and 12 are connected to the general feed channel 22 through transverse channels 24 and 25 respectively.

During the compression phase the piston 4 moves from the top downwards and sends the fluid being pumped into a high pressure fluid receiver which is not shown here. The pressure produced in the fluid being pumped is exerted upon each auxiliary piston 18 the movement of which from the bottom upwards compresses the spring 19.

By this movement the pressure which is exerted on the viscous fluid delivers part of it into the annular seal 10 and another part into the feed channel 22 to the bearings, depending upon the leakage flows from the seal and from the hydrostatic fluid film cushions. A non-return valve 26 is opposed to the delivery of the viscous fluid into its feed circuit represented by its pump 27 and its tank 28. These leakage flows are channelled and re-cycled into the general feed circuit of the viscous fluid, this being the circuit represented by the channels 13 and 14 which open into a longitudinal groove 29 and a discharge pipe 30 connected to the tank 28.

During the suction phase the piston 4 moves from the bottom upwards and the fluid being pumped is sucked into the chamber 6 through the valve 7. At this time the pressure from the pump 27 feeds the cylinder 17, the bearings 11 and 12 and the seal 10 with viscous fluid. This feed pressure is chosen to be sufficient to ensure satisfactory guidance of the piston by the fluid bearings during this phase of operation. It may, for example, be 50 bars.

Figure 2:
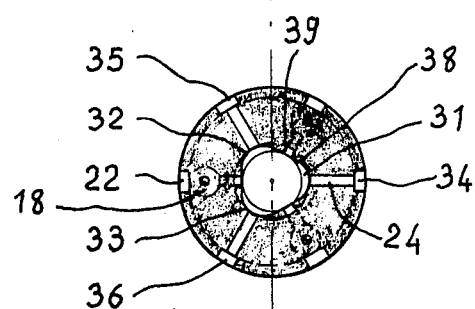
FIG. 2 is a partial transverse section along II—II in FIG. 1.

FIG. 2 shows in cross section the fluid bearing 11 with its three cushions 31, 32, 33 in recesses formed by by internal milling, and fed by ducts such as 24. These ducts are preferably very narrow so as to create a significant pressure drop in the flow of the viscous fluid, because it is thus, as is well known, that the fluid cushions acquire sufficient stiffness.

This FIG. 2 shows in addition the three longitudinal grooves such as 22 for feeding with fluid the ducts such as 25 from the bearing 12, and the three longitudinal grooves 34, 35 and 36, for feeding the cushions 31, 32 and 33. It will be observed that the bearing 12 has its cushions offset by 60° with respect to those of the bearing 11 so as to facilitate the flow of the viscous fluid between the two bearings, in particular into the recovery groove 37 where the discharge channel 13 opens out.

Another recovery groove 38 is shown in broken line in FIG. 2. It communicates with the groove 37 through three longitudinal grooves such as 39 between the cushions 31, 32 and 33.

FIG. 3 shows a variant in which the sleeve holds block 40 wherein bearings 11 and 12, which here are not offset, are machined separately in block 40 which is then fitted by shrinking into the sleeve 2. This machining separately enables the longitudinal discharge grooves such as 41 to be produced on the outside of this block, which is easier than in a small bore as in the embodiment as FIGS. 1 and 2. A flange 42 simultaneously retains the sleeve and the bearing blocks.

The piston 4 resides within bore 52 having cylinder walls 51 separated by a close clearance gap 50.

The other details of this embodiment may be reference characters being used such as piston 18 and biassing spring 17.

In addition this FIG. 3 shows a preferred embodiment for producing the pressure drop in the ducts such as 24 for feeding the cushions such as 11. These ducts each include a bored sleeve such as 43 fitted by forcing into radial holes aligned between the sleeve 2 and the block 40. Inside each sleeve 43 a calibrated cylindrical needle 44 is located with a radial clearance 54 of a few microns from the bore of the sleeve. The laminar flow of the viscous fluid between the needle and the sleeve gives the desired pressure drop. The sleeve and the needle have shoulders which prevent them from being driven towards the axis by the pressure, with small grooves, thus 44a, for enabling flow of the viscous fluid.

FIG. 4 shows another variant in which the removable cushions such as 45 are machined each at the end of a block such as 46, which in turn is fitted radially through the sleeve 2 which here constitutes the body of the pump. Each block is tightened by a connection 47. The Figure shows only one of these units but as previously there are two groups 11 and 12 of at least three of them, distributed uniformly round the axis of the piston 4, which here is horizontal. The needle 44 is retained by a keeper 44b.

In this variant there is shown in addition a single auxiliary piston 48 which is located in an external cylinder 49 connected by pipework such as 50 to the various connections such as 47 and to the sealing groove 10.

FIG. 5 represents partially a variant which is distinguished with respect to FIGS. 1 and 2 by a single annular auxiliary piston 51 instead of the previous cylindrical pistons such as 18 as well as by laminar pressure drop needles such as 44, introduced directly with very slight clearance into radial bores in the sleeve 2.

The fluid bearings 11 and 12 are not offset, which enables a single groove 52 in the bore of the sleeve 2 and passing between the cushions, to gather all of the leakages of viscous fluid. The latter fall into the open tank 28 inside a general casing which is not shown.

The embodiments as FIGS. 3, 4 and 5 do not on the whole modify the method of operation explained in the case of FIG. 1 and they are in themselves sufficient to explain the special features of operation associated with the Figure in each case.

Although the embodiments are described in the case where they are employed as very high pressure pumps they are also quite capable of being employed as hydraulic motors which receive their energy from a very high pressure motive fluid and which transmit it to the piston in the form of mechanical energy.

By way of example some essential physical and geometrical characteristics are indicated below of the parts of a pump which must deliver a flow of 5 liters/min of water at a pressure of 4000 bars, the viscous fluid employed being glycerine.

Diameter of the piston: 30 mm
Clearance at the radius between piston and sleeve: 3.5/$\mu$u
Travel of piston: 283 mm
Mean speed of piston: 0.24 m/s
Generative pressure in the cushion: 2500 bars
Dimensions of the cushions:
  in the axial direction: 23.4 mm
  in the transverse direction: 15.7 mm
Leakage flow for one cushion: 23.7 mm$^3$/s
Leakage flow from the seal: 21.4 mm$^3$/s.

We claim:

1. In hydraulic apparatus of the kind in which a reciprocating piston is slidably fitted with a close clearance gap between it and a cylinder wall designed for forming at an end thereof a high pressure hydraulic chamber located in a hydraulic flow channel for the processing of a first main fluid, the combination comprising,
  a further flow channel for the feeding of a second auxiliary viscous fluid distinct from said first main fluid though minglable therewith,
  a groove formed on said wall adjacent said high pressure hydraulic chamber and fed from said further flow channel with said second auxiliary viscous fluid to fill said close clearance gap thereby effectively sealing said high pressure hydraulic chamber around said piston, said close clearance gap allowing fluid leakage therethrough thereby permitting said first and second fluids directly to contact each other, and means in the wall providing a twin hydrostatic bearing system for said piston at a distance from said groove on the side thereof remote from said high pressure hydraulic chamber, said twin hydrostatic bearing system being fed with said second auxiliary viscous fluid in parallel with said groove and comprising two separate and distinct elemental fluid bearings formed by separate grooves in said cylinder wall spaced lengthwise along said piston.

2. Apparatus as claimed in claim 1, further comprising a pressure balancing system operatively associated with both said flow channels for equalizing the pressure of said second auxiliary viscous fluid to that of said first main fluid, said pressure balancing system comprising, a cylindrical space having opposite ends respectively connected to said high pressure hydraulic chamber and to a part of said further flow channel upstream of the in-parallel feed of both said groove and said hydrostatic bearing system with said second auxiliary viscous fluid, whereby said cylindrical space is in bypass relationship with said close clearance gap extending between said groove and said high pressure hydraulic chamber, and a piston-like pressure-responsive partition slidably housed in said cylindrical space and having two opposite faces respectively exposed to said first main fluid in said high pressure hydraulic chamber and to said second auxiliary viscous fluid in said upstream part of said further flow channel, whereby said piston-like partition senses through one face thereof the main fluid pressure in said high pressure hydraulic chamber, and instantaneously reflects said main fluid pressure through the other face thereof upon said second auxiliary viscous fluid which is thus synchronously pressurized.

3. Apparatus as claimed in claim 2, wherein said pressure balancing system further comprises, spring means in said cylindrical space for biassing said piston-like partition against said main fluid pressure exerted thereon.

4. Apparatus as claimed in claim 1, wherein said hydrostatic bearing system comprises a pressure loss causing needle adjustably fitted with close clearance in the corresponding auxiliary viscous fluid feed, whereby the viscous fluid pressure in said hydrostatic bearing system is controllably lowered with respect to the viscous fluid pressure in said groove, by adjustment of said needle.

5. Apparatus as claimed in claim 4, wherein said hydrostatic bearing system is further fed with auxiliary viscous fluid leaking from said groove through said close clearance gap between the piston and cylinder wall.

6. Apparatus as claimed in claim 1, comprising a sleeve forming said cylinder wall in which said groove is formed, and a block fitting into said sleeve and in which said hydrostatic bearing system is formed.

7. Apparatus as claimed in claim 6, wherein said elemental bearings are both formed in said block and wherein said block comprises on its outer surface a drain for the outflow of leaking viscous fluid.

8. Apparatus as claimed in claim 1, wherein each of said elemental bearings comprises at least three discrete gaps arcuately spaced around said piston, each gap being fed with pressurized viscous fluid, said apparatus further comprising duct means for collecting and draining off viscous fluid leaking from said groove and from said discrete gaps of each of said elemental bearings.

9. Apparatus as claimed in claim 8, wherein correspondingly located gaps of respective elemental bearings are aligned with each other parallel to the piston axis, and wherein said duct means comprises a longitudinally grooved drain extending intermediate adjacent gaps of said elemental bearings.

* * * * *